J. H. WAGENHORST.
AUTOMOBILE SPRING.
APPLICATION FILED FEB. 8, 1917.
1,372,210.
Patented Mar. 22, 1921.
2 SHEETS—SHEET 1.
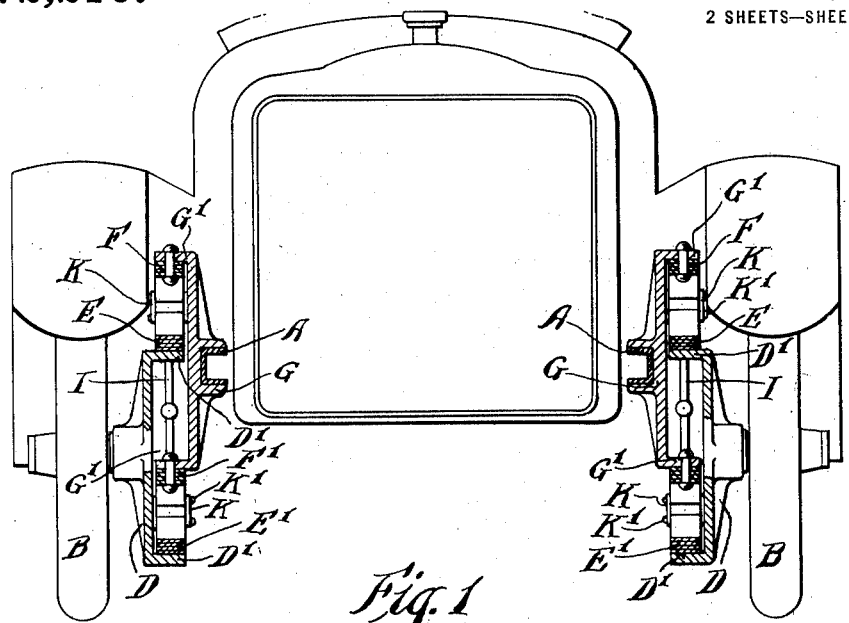
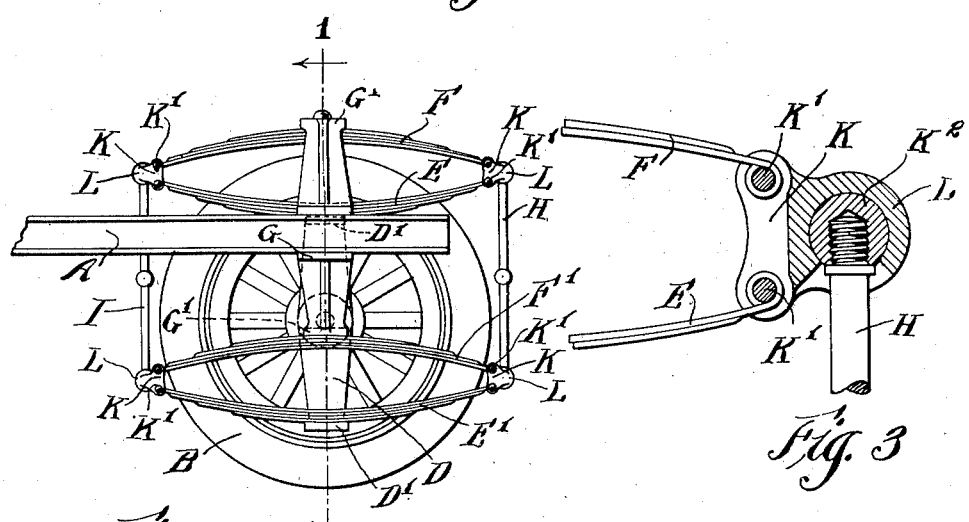
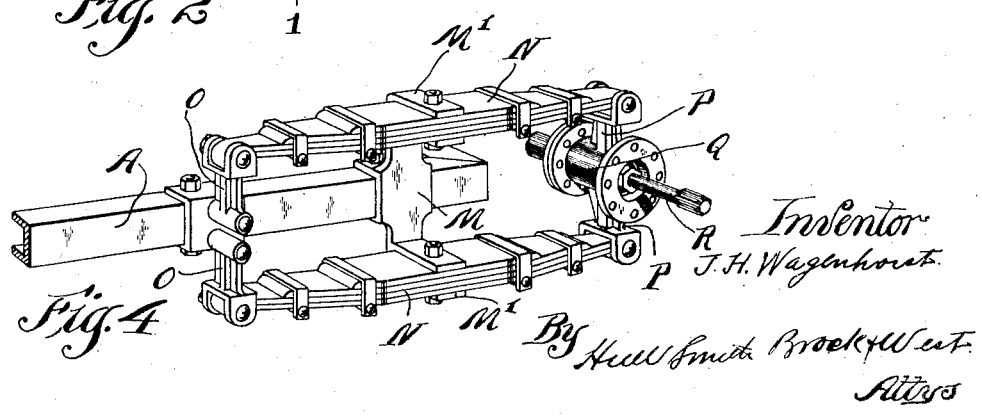
Inventor
J. H. Wagenhorst.

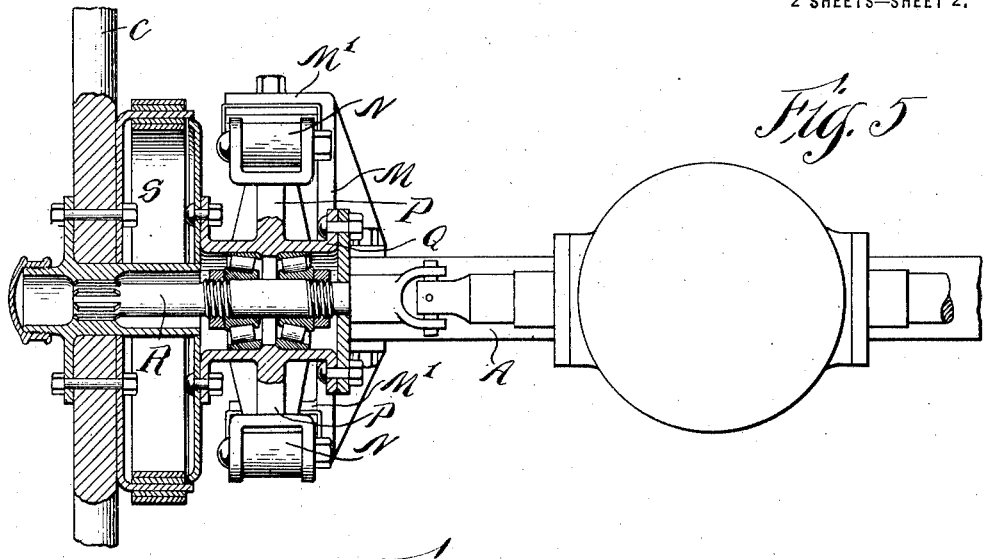
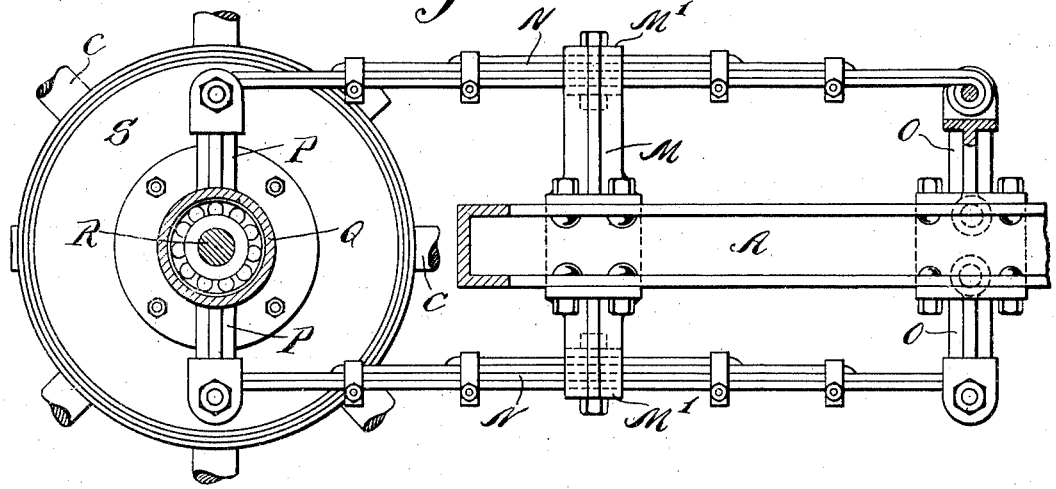
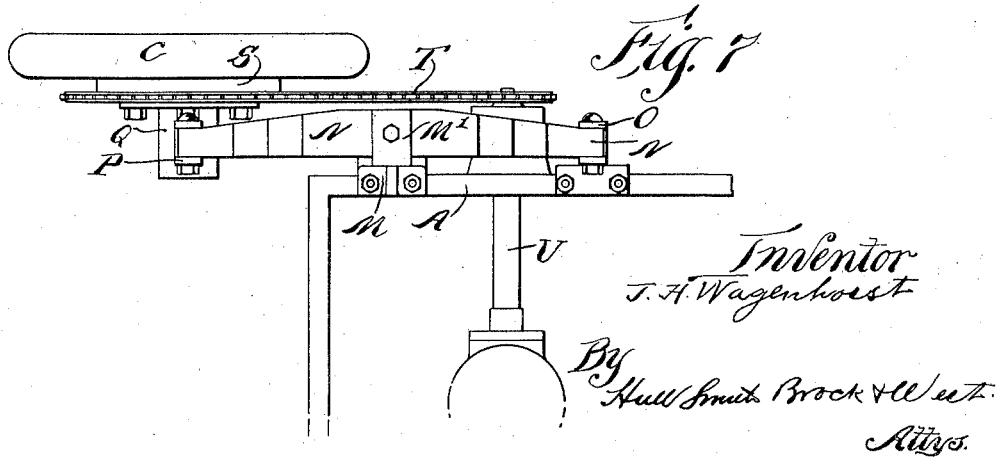

UNITED STATES PATENT OFFICE.

JAMES H. WAGENHORST, OF AKRON, OHIO.

AUTOMOBILE-SPRING.

1,372,210.  Specification of Letters Patent.  Patented Mar. 22, 1921.

Application filed February 8, 1917. Serial No. 147,305.

*To all whom it may concern:*

Be it known that I, JAMES H. WAGENHORST, a citizen of the United States, residing at Akron, in the county of Summit and State of Ohio, have invented a certain new and useful Improvement in Automobile-Springs, of which the following is a full, clear, and exact description, reference being had to the accompanying drawings.

This invention relates generally to automobiles, and more particularly to the construction and arrangement of the springs thereof.

In automobiles as usually constructed there is a front axle and a rear axle each having one or more parts connected thereto and which constitute the unsprung weight of the automobile. This unsprung weight is detrimental, particularly to tires and the object of my invention primarily is the elimination of unsprung weight.

This I accomplish by doing away with the front and rear axles and connecting the front and rear wheels to springs which in turn are connected to the automobile frame.

In the elimination of the unsprung weight by means of springs I also propose to utilize the lateral strength of the springs to withstand the lateral strains placed upon the wheels while at the same time utilizing the vertical elasticity of said springs, and it is also proposed to eliminate, as far as possible, the friction of moving parts.

With these various objects in view my invention consists in the novel features of construction and arrangement hereinafter fully described and set forth in the claims.

In the drawings forming a part of this specification I have shown one embodiment of my inventive idea but it will be understood that other forms may be employed within the scope of the appended claims without departing from the broad principle of the invention.

In these drawings Figure 1 is a front view of an automobile provided with front springs constructed and arranged in accordance with my invention; Fig. 2 is a side elevation of one of said springs; Fig. 3 is a sectional detail; Fig. 4 is a detail perspective view showing one of the rear springs; Fig. 5 is a sectional view of a rear spring and the wheel connected therewith; Fig. 6 is a face view of the rear spring; Fig. 7 is a partial plan view showing a chain drive arranged in connection with the rear wheel and spring.

In carrying out my invention I employ the usual or any suitable construction of automobile frame A, and in connection therewith the front wheels B and the rear wheels C. Each front wheel B is mounted upon a spindle projecting laterally from a vertical casting or forging D, the upper and lower ends of which project inwardly as shown at D' and to which are connected the leaf springs E and E', the ends of these springs E and E' being connected to the ends of the leaf springs F and F', said springs F and F' being connected at their centers to the outwardly projecting portions G' of a bracket casting or forging G which is securely bolted to the side of the automobile frame near the forward end thereof, and the connection between the springs F and F' and the ears or lugs G' is a pivotal connection so that the wheel B together with the springs can turn exactly the same as at present by means of the knuckle connection between the spindle and axle.

The front and rear ends of the springs E and F and E' and F' are connected by means of vertical tie rods H and I respectively and a steering link rod can be connected to either of these vertical tie rods.

In Figs. 2 and 3 I have shown one form of connection in which a shackle K is employed and to which the ends of the springs are connected at K'. The upper end of the rod H is provided with a ball K² which fits in a socket L so that the springs can move up and down in unison and a universal connection provided at their points of connection with the tie rods.

The springs E, E', F and F' are built up of any desired number of layers suitably connected together and are preferably widest at their central portions and taper toward their ends. These springs will be of such size as to provide a strong spring frame, the lateral strength of its spring members being sufficient to withstand all lateral strains which may be placed upon the wheels and at the same time these springs will be sufficiently elastic to yield vertically and take up any shock which might be received by the wheel and therefore prevent such shock being transmitted to the automobile.

In the constructions shown in Figs. 1 and 2 the springs are bowed in opposite directions and are connected alternately with the wheel bracket casting and the frame bracket casting and are connected at their opposite ends, so that in operation they work one against the other thereby facilitating the shock absorbing or springing functions of the parts.

At the rear of the automobile frame, I arrange the vertical brackets M having inwardly projecting portions M' upon which are fulcrumed the rear springs N, said rear springs being composed of any desired number of leaves and in practice I prefer to connect the forward ends of these springs to the automobile frame by means of links O while the rear ends of these springs N are connected by means of a member P which is integral with the bearing sleeve Q of the rear wheel, the spindle R of said rear wheel passing centrally through the bearing sleeve Q, which contains the usual or any approved construction of ball bearings, and if desired the brake drum S may be connected to the rear wheel and interposed between the bearing sleeve, and wheel or any other convenient arrangement may be employed.

The springs N are preferably widest at their central portions and taper toward each end as indicated in Fig. 7 and these springs are also made sufficiently strong to withstand all lateral strains placed upon them while yielding freely vertically. In Fig. 5 I have shown the spindle of the wheel connected to a universal shaft which in turn is connected with the differential (not shown) and in Fig. 7 I have shown the rear wheel driven from the sprocket chain T which in turn is driven from the shaft U which is also connected with the differential.

The manner of driving the rear wheels is immaterial and constitutes no part of my invention inasmuch as my improvement has to do only with the construction and arrangement of the front and rear springs and their connection with the frame or chassis of the automobile whereby the front and rear axles are dispensed with and consequently that amount of unsprung weight eliminated.

It will be understood that various forms of springs can be employed at both the front and rear of the automobile and all within the scope of my invention which primarily has in view the utilization of the lateral strength of the springs to withstand lateral strains while at the same time making use of the maximum vertical resiliency of said springs and in so doing eliminate the friction of moving parts.

Having thus described my invention, what I claim is:

1. The combination with a motor vehicle frame, of a wheel, a wheel support projecting laterally outwardly with reference to the frame, springs connected to the frame and to the wheel support, said springs being connected to each other at the ends, said wheel support and springs being turnable in unison with reference to the motor vehicle frame.

2. The combination with a frame, of a wheel support independent of said frame, and springs arranged above and below said frame and connected thereto and to said wheel support, the opposite ends of said springs being held in fixed relation to each other.

3. The combination with a frame, of a spring supporting member connected thereto, a wheel support, springs connected to said support above and below said frame and having connection with said wheel support, the ends of said springs being held against vertical separation.

4. The combination with a frame, of a wheel support, a pair of springs connected with the frame, above and below the same, a pair of springs connected to the wheel support above and below the frame, the ends of said springs being connected together.

In testimony whereof, I hereunto affix my signature.

JAMES H. WAGENHORST.